United States Patent
Higashi et al.

(10) Patent No.: US 6,873,332 B2
(45) Date of Patent: Mar. 29, 2005

(54) MICROCOMPUTER HAVING OSD CIRCUIT, AND BUS CONTROL DEVICE AND METHOD

(75) Inventors: Toshihiko Higashi, Osaka (JP); Toshihiro Matsumura, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/374,132

(22) Filed: Feb. 27, 2003

(65) Prior Publication Data

US 2003/0160773 A1 Aug. 28, 2003

(30) Foreign Application Priority Data

Feb. 28, 2002 (JP) ........................................ 2002-053496

(51) Int. Cl.[7] .............................................. G06F 13/14
(52) U.S. Cl. ...................................... 345/520; 345/501
(58) Field of Search ................................ 345/541, 543, 345/544, 530, 501, 519, 520, 551, 549

(56) References Cited

U.S. PATENT DOCUMENTS 5,640,502 A * 6/1997 Knox et al. ................. 345/554
6,219,072 B1 * 4/2001 Tanaka et al. .............. 345/531
6,611,270 B1 * 8/2003 Hosotani .................... 345/520

FOREIGN PATENT DOCUMENTS

| JP | 11-102352 | 4/1999 |
|----|-----------|--------|
| JP | 11-134291 | 5/1999 |

* cited by examiner

*Primary Examiner*—Kee M. Tung
(74) *Attorney, Agent, or Firm*—McDermott Will & Emery LLP

(57) ABSTRACT

The microcomputer includes a CPU, a ROM, an OSD circuit, a wait signal generation circuit and a bus switch circuit. The ROM stores a program to be executed by the CPU and display data to be on-screen displayed on a display. The OSD circuit reads the display data stored in the ROM and outputs the read data to the display. The wait signal generation circuit generates a wait signal having a first level of a first time period and a second level of a second time period repeated alternately. The wait signal generation circuit determines the length of the first time period according to the amount of the display data to be read from the ROM to the OSD circuit. The bus switch circuit establishes a bus between the OSD circuit and the ROM when the wait signal is in the first level, and establishes a bus between the CPU and the ROM when the wait signal is in the second level.

10 Claims, 7 Drawing Sheets

MICROCOMPUTER HAVING OSD CIRCUIT, AND BUS CONTROL DEVICE AND METHOD

BACKGROUND OF THE INVENTION

The present invention relates to a microcomputer, a bus control device and a bus control method. More particularly, the present invention relates to a microcomputer having an on-screen display (OSD) circuit and a bus control device and method used when a CPU and the OSD circuit share a same ROM.

A microcomputer having an OSD circuit embedded therein is mounted in AV equipment such as T.V. sets and video decks, to enable on-screen display of various kinds of information including the channel and the volume on a display such as a cathode ray tube (CRT) and a liquid crystal display (LCD).

In some of OSD circuit-embedded microcomputers, the OSD circuit and a CPU share a same ROM, as disclosed in Japanese Laid-Open Patent Publication Nos. 11-102352 and 11-134291, for example. In such microcomputers, bus control is performed to permit alternate access of the CPU and the OSD circuit to the ROM at the proportion of 1:1, in which read of instruction data by the CPU and read of display data by the OSD circuit are performed in a time-sharing manner.

In the microcomputers described above, the alternate access of the OSD circuit and the CPU to the ROM at the proportion of 1:1 must be followed even when the need arises for the OSD circuit to access the ROM. Therefore, if the number of characters and the number of colors of a character to be displayed increase, and thus a large amount of display data must be read from the ROM to the OSD circuit, the OSD circuit may fail to access the ROM sufficiently.

SUMMARY OF THE INVENTION

An object of the present invention is providing a microcomputer enabling efficient access of an OSD circuit to a ROM.

According to one aspect of the invention, the microcomputer includes a CPU, a ROM, an on-screen display (OSD) circuit, a wait signal generation circuit and a bus switch circuit. The ROM stores a program to be executed by the CPU and display data to be on-screen displayed on a display. The OSD circuit reads the display data stored in the ROM and outputs the read data to the display. The wait signal generation circuit generates a wait signal having a first level of a first time period and a second level of a second time period repeated alternately. The wait signal generation circuit determines the length of the first time period according to the amount of the display data to be read from the ROM to the OSD circuit. The bus switch circuit establishes a bus between the OSD circuit and the ROM when the wait signal is in the first level and establishes a bus between the CPU and the ROM when the wait signal is in the second level.

In the microcomputer described above, the first time period during which a bus is established between the OSD circuit and the ROM and the second time period during which a bus is established between the CPU and the ROM are repeated alternately. This permits execution of read of display data from the ROM by the OSD circuit and read of instruction data from the ROM by the CPU in a time-sharing manner. The length of the first time period is determined according to the display data to be read from the ROM to the OSD circuit. For example, when a comparatively large amount of display data is to be read from the ROM to the OSD circuit, the first time period is set longer accordingly. In this way, sufficient access of the OSD circuit to the ROM can be secured even when the amount of the display data to be read from the ROM to the OSD circuit is large.

Preferably, the microcomputer described above further includes a first bus, a second bus and a third bus. The first bus is placed between the ROM and the bus switch circuit. The second bus is placed between the CPU and the bus switch circuit. The third bus is placed between the OSD circuit and the bus switch circuit. The bus switch circuit connects the first bus with the third bus when the wait signal is in the first level. By this connection, a bus is established between the OSD circuit and the ROM. The bus switch circuit connects the first bus with the second bus when the wait signal is in the second level. By this connection, a bus is established between the CPU and the ROM.

Preferably, the wait signal generation circuit determines the length of the first time period according to the number of characters to be on-screen displayed on the display.

With increase of the number of characters to be on-screen displayed, the amount of display data to be read from the ROM to the OSD circuit increases. In the microcomputer described above, the length of the first time period is determined according to the number of characters to be on-screen displayed on the display. For example, when a comparatively large number of characters are to be on-screen displayed on the display, the first time period is set longer accordingly.

Preferably, the wait signal generation circuit determines the length of the first time period according to the number of colors of a character to be on-screen displayed on the display.

With increase of the number of colors of a character to be on-screen displayed, the amount of display data to be read from the ROM to the OSD circuit increases. Herein, the number of colors of a character refers to the number of colors selectable for the character. In the microcomputer described above, the length of the first time period is determined according to the number of colors of a character to be on-screen displayed on the display. For example, when a comparatively large number of colors of a character are to be on-screen displayed on the display, the first time period is set longer accordingly.

According to another aspect of the invention, the bus control device is a bus control device used when a CPU and an OSD circuit share a same ROM, and includes a wait signal generation circuit and a bus switch circuit. The ROM stores a program to be executed by the CPU and display data to be on-screen displayed on a display. The OSD circuit reads the display data stored in the ROM and outputs the read data to the display. The wait signal generation circuit generates a wait signal having a first level of a first time period and a second level of a second time period repeated alternately. The wait signal generation circuit determines the length of the first time period according to the amount of the display data to be read from the ROM to the OSD circuit. The bus switch circuit establishes a bus between the OSD circuit and the ROM when the wait signal is in the first level and establishes a bus between the CPU and the ROM when the wait signal is in the second level.

Preferably, the wait signal generation circuit determines the length of the first time period according to the number of characters to be on-screen displayed on the display.

Preferably, the wait signal generation circuit determines the length of the first time period according to the number of colors of a character to be on-screen displayed on the display.

According to yet another aspect of the invention, the bus control method is a bus control method used when a CPU and an OSD circuit share a same ROM. The ROM stores a program to be executed by the CPU and display data to be on-screen displayed on a display. The OSD circuit reads the display data stored in the ROM and outputs the read data to the display. In this bus control method, first processing and second processing are performed alternately. In the first processing, a bus is established between the OSD circuit and the ROM for a first time period. In the second processing, a bus is established between the CPU and the ROM for a second time period. The length of the first time period is determined according to the amount of the display data to be read from the ROM to the OSD circuit.

Preferably, the length of the first time period is determined according to the number of characters to be on-screen displayed on the display.

Preferably, the length of the first time period is determined according to the number of colors of a character to be on-screen displayed on the display.

DESCRIPTION OF THE PREFERRED EMBODIMENTS

Figure 1:
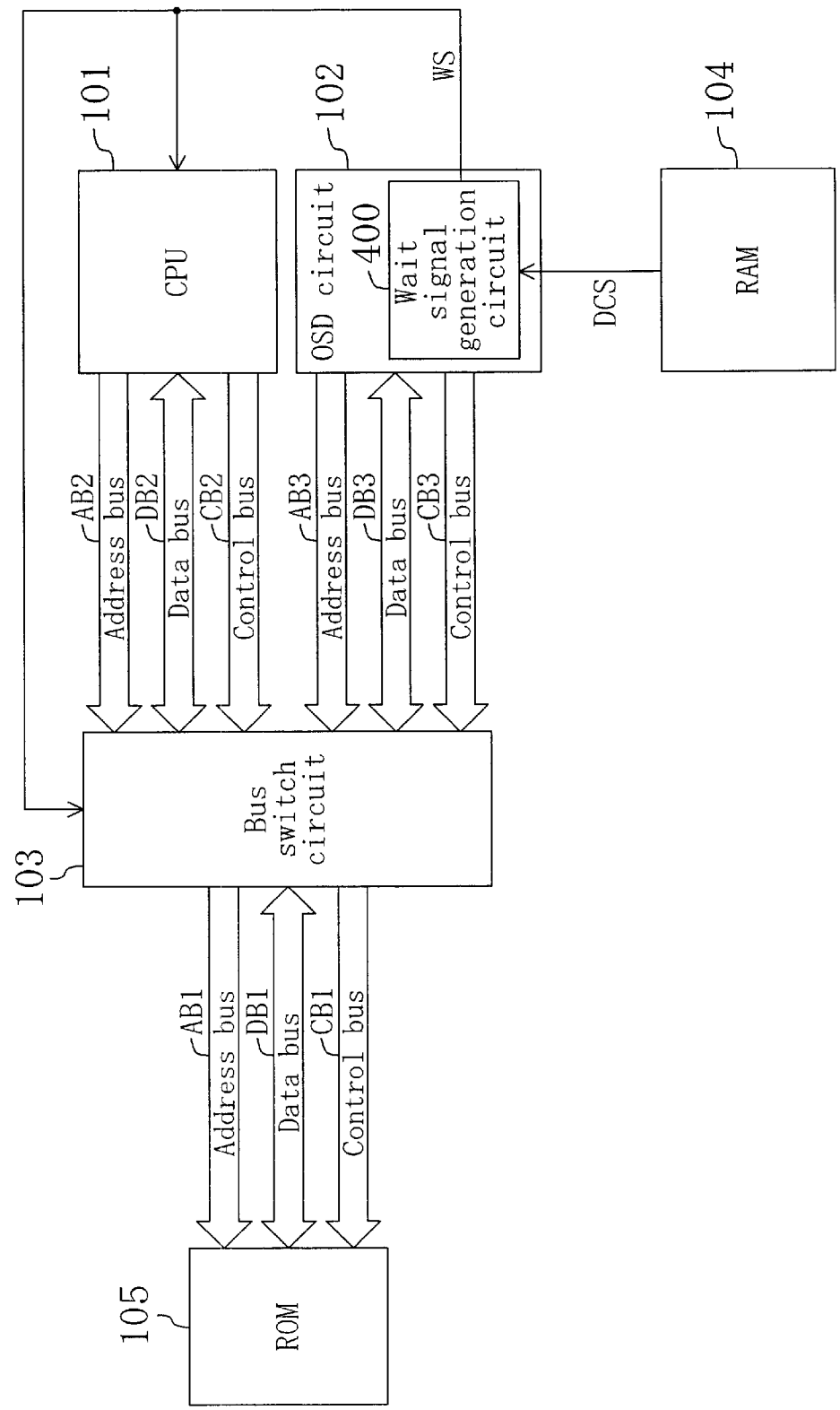
FIG. 1 is a block diagram of a microcomputer of Embodiment 1 of the present invention.

Hereinafter, preferred embodiments of the present invention will be described with reference to the accompanying drawings. The same or like components are denoted by the same reference numerals throughout the drawings, and description of such components will not be repeated.

Embodiment 1
<Configuration of Microcomputer>

FIG. 1 shows a configuration of a microcomputer of Embodiment 1 of the present invention. Referring to FIG. 1, the microcomputer includes a CPU 101, an OSD circuit 102, a bus switch circuit 103, a RAM 104, a ROM 105, address buses AB1 to AB3, data buses DB1 to DB3 and control buses CB1 to CB3. This microcomputer, having the OSD circuit 102 embedded therein, is to be mounted in AV equipment such as T.V. sets and video decks. In this microcomputer, also, the CPU 101 and the OSD circuit 102 share the same ROM 105.

The ROM 105 stores a program (instruction data) to be executed by the CPU 101 and display data (for example, character font data) to be on-screen displayed on a display (not shown).

The RAM 104 stores display control data. The display control data as used herein refers to add-on information such as the type of a character (for example, character code) to be on-screen displayed, the color of the character, the background color, and blinking or not.

The address bus AB1, the data bus DB1 and the control bus CB1 are placed between the ROM 105 and the bus switch circuit 103. An address is sent to the ROM 105 from the bus switch circuit 103 via the address bus AB1. Data is exchanged between the ROM 105 and the bus switch circuit 103 via the data bus DB1. A control signal is sent to the ROM 105 from the bus switch circuit 103 via the control bus CB1.

The address bus AB2, the data bus DB2 and the control bus CB2 are placed between the bus switch circuit 103 and the CPU 101. An address is sent to the bus switch circuit 103 from the CPU 101 via the address bus AB2. Data is exchanged between the CPU 101 and the bus switch circuit 103 via the data bus DB2. A control signal is sent to the bus switch circuit 103 from the CPU 101 via the control bus CB2.

The address bus AB3, the data bus DB3 and the control bus CB3 are placed between the bus switch circuit 103 and the OSD circuit 102. An address is sent to the bus switch circuit 103 from the OSD circuit 102 via the address bus AB3. Data is exchanged between the OSD circuit 102 and the bus switch circuit 103 via the data bus DB3. A control signal is sent to the bus switch circuit 103 from the OSD circuit 102 via the control bus CB3.

The OSD circuit 102 reads display data from the ROM 105 based on display control data DCS from the RAM 104. The OSD circuit 102 generates an OSD display signal based on the display data read from the ROM 105 and the display control data DCS read from the RAM 104, and outputs the generated signal to the display (not shown). In this way, various kinds of information including the channel and the volume are displayed on the display such as a CRT and a LCD.

The OSD circuit 102 includes a wait signal generation circuit 400 for generating a wait signal WS based on the display control data DCS from the RAM 104. The wait signal WS is a signal having a H level (logically high level) of a first time period and a L level (logically low level) of a second time period repeated alternately.

The bus switch circuit 103 connects the address bus AB1, the data bus DB1 and the control bus CB1 with the address bus AB3, the data bus DB3 and the control bus CB3, respectively, when the wait signal WS is in the H level, to thereby establish buses between the OSD circuit 102 and the ROM 105. Contrarily, the bus switch circuit 103 connects the address bus AB1, the data bus DB1 and the control bus CB1 with the address bus AB2, the data bus DB2 and the control bus CB2, respectively, when the wait signal WS is in the L level, to thereby establish buses between the CPU 101 and the ROM 105.

<Bus Control>

Figure 2:
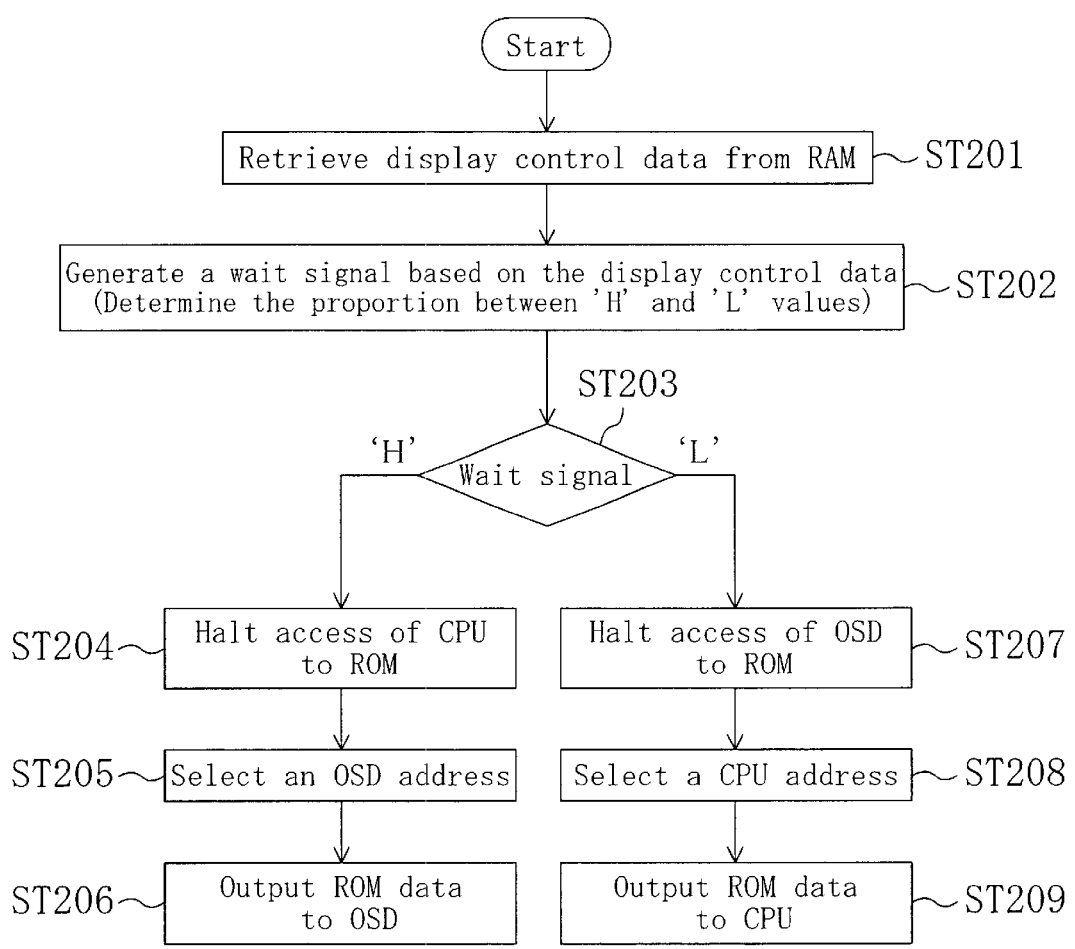
FIG. 2 is a flowchart demonstrating bus control by the microcomputer shown in FIG. 1.

Control of the buses in the microcomputer having the above configuration will be described with reference to FIG. 2.

First, the OSD circuit 102 reads the display control data DCS from the RAM 104 before accessing to the ROM 105 (ST201).

The wait signal generation circuit 400 of the OSD circuit 102 generates the wait signal WS based on the display control data DCS (ST202), and outputs the wait signal WS to the CPU 101 and the bus switch circuit 103.

When the wait signal WS is in the H level, the CPU 101 turns its read enable signal (control signal) to the H level (inactive state) to thereby disable data read from the ROM 105. In this way, the CPU 101 halts its access to the ROM 105 and puts itself in the access wait state. The bus switch circuit 103 connects the address bus AB1, the data bus DB1 and the control bus CB1 with the address bus AB3, the data bus DB3 and the control bus CB3, respectively. By this connection, an address and a read enable signal (control signal) are sent from the OSD circuit 102 to the ROM 105 (ST203, ST204, ST205). Display data stored at the given address is read from the ROM 105 onto the data bus DB1, and received by the OSD circuit 102 via the bus switch circuit 103 and the data bus DB3 (ST206).

When the wait signal WS is in the L level, the OSD circuit 102 turns its read enable signal (control signal) to the H level (inactive state) to thereby disable data read from the ROM 105. In this way, the OSD circuit 102 halts its access to the ROM 105 and puts itself in the access wait state. The bus switch circuit 103 connects the address bus AB1, the data bus DB1 and the control bus CB1 with the address bus AB2, the data bus DB2 and the control bus CB2, respectively. By this connection, an address and the read enable signal (control signal) are sent from the CPU 101 to the ROM 105 (ST203, ST207, ST208). Instruction data stored at the given address is read from the ROM 105 onto the data bus DB1, and received by the CPU 101 via the bus switch circuit 103 and the data bus DB2 (ST209).

Figure 3:
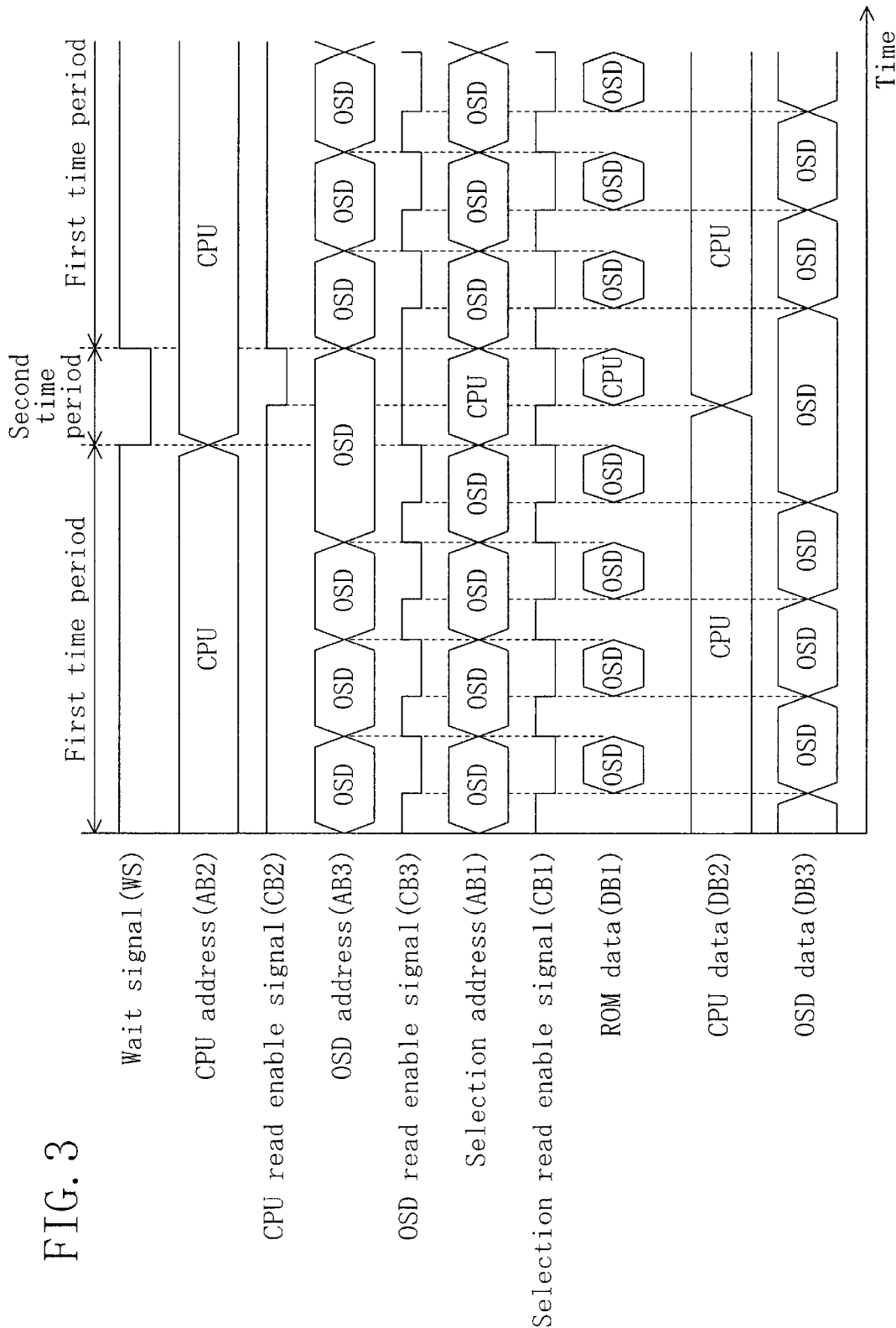
FIG. 3 is a timing chart demonstrating the bus control by the microcomputer shown in FIG. 1.

FIG. 3 shows a timing chart related to the bus control described above. Referring to FIG. 3, when the wait signal WS is in the H level, the CPU 101 halts its access to the ROM 105 and is put in the access wait state, so that an address from the OSD circuit 102 is sent to the ROM 105 as the selection address. ROM data stored at the selection address is output to the OSD circuit 102 via the data buses DB1 and DB3.

When the wait signal WS is in the L level, the OSD circuit 102 halts its access to the ROM 105 and is put in the access wait state, so that an address from the CPU 101 is sent to the ROM 105 as the selection address. ROM data stored at the selection address is output to the CPU 101 via the data buses DB1 and DB2.

<Configuration of Wait Signal Generation Circuit 400>

Figure 4:
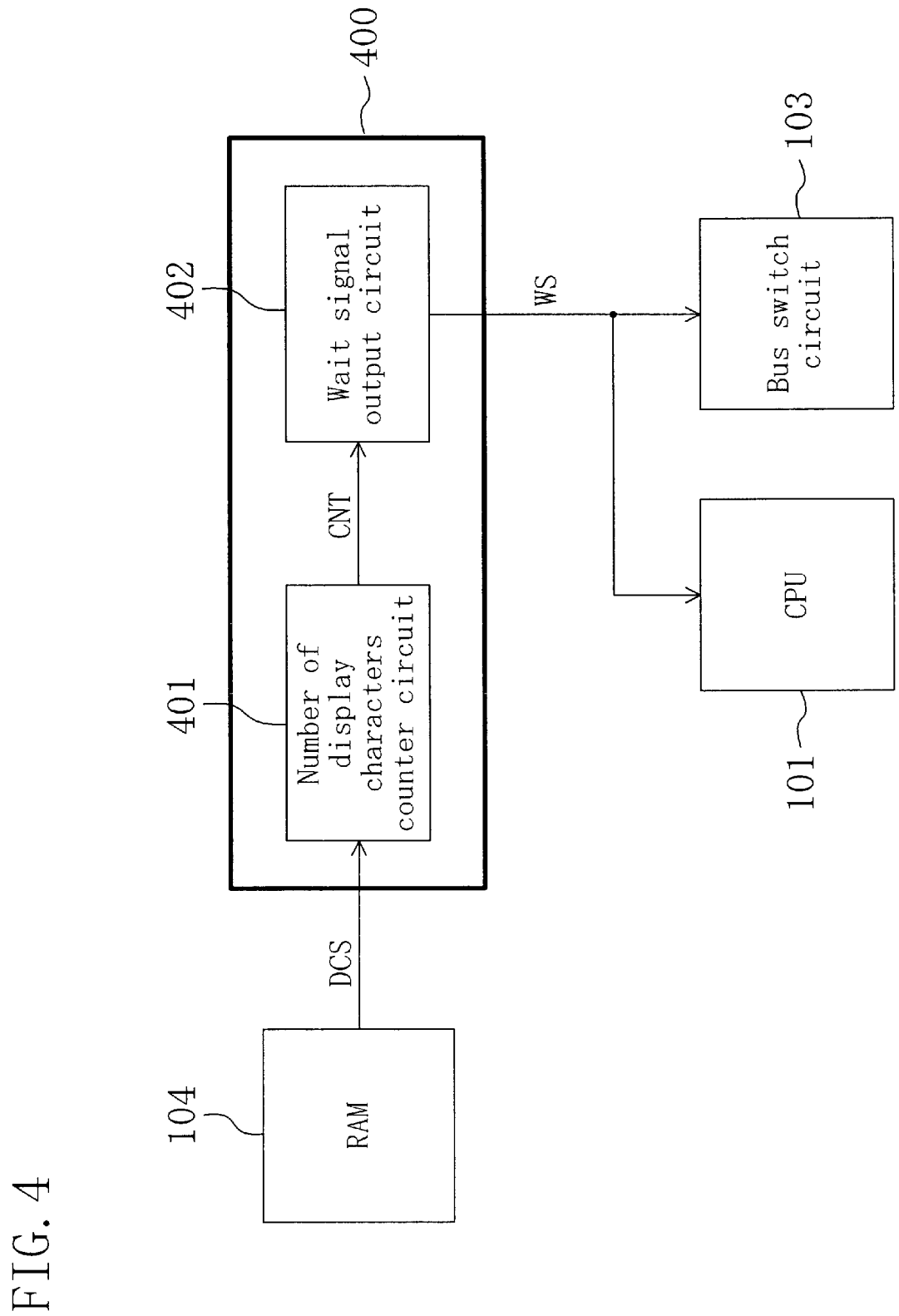
FIG. 4 is a block diagram of a wait signal generation circuit shown in FIG. 1.

FIG. 4 shows an internal configuration of the wait signal generation circuit 400, which includes a counter circuit 401 and an output circuit 402. The counter circuit 401 counts the number of characters to be on-screen displayed (number of display characters). The output circuit 402 generates the wait signal WS based on a count value CNT output from the counter circuit 401.

<Operation of Wait Signal Generation Circuit 400>

The operation of the wait signal generation circuit 400 having the configuration described above will be described.

First, the counter circuit 401 retrieves the display control data DCS stored in the RAM 104. One unit of display control data DCS is stored for each character to be on-screen displayed.

The counter circuit 401 counts the number of times of retrieval of the display control data DCS for a predetermined time period (for example, for a time period corresponding to one line), and outputs the resultant count value CNT to the output circuit 402 as the number of display characters.

The output circuit 402 determines the length of the first time period, during which the wait signal WS is in the H level, based on the count value CNT. As the count value CNT is larger, a longer first time period is determined. Assume herein that the length of the first time period is set at (CNT×T) where T is the reference unit and herein defined as the time period corresponding to two cycles of a system clock. The length of the second time period is set at two cycles of the system clock, which is therefore constant irrelevant of the count value CNT. The output circuit 402 then outputs the wait signal WS, in which the H level of the first time period and the L level of the second time period are repeated alternately, to the CPU 101 and the bus switch circuit 103.

Figure 5:
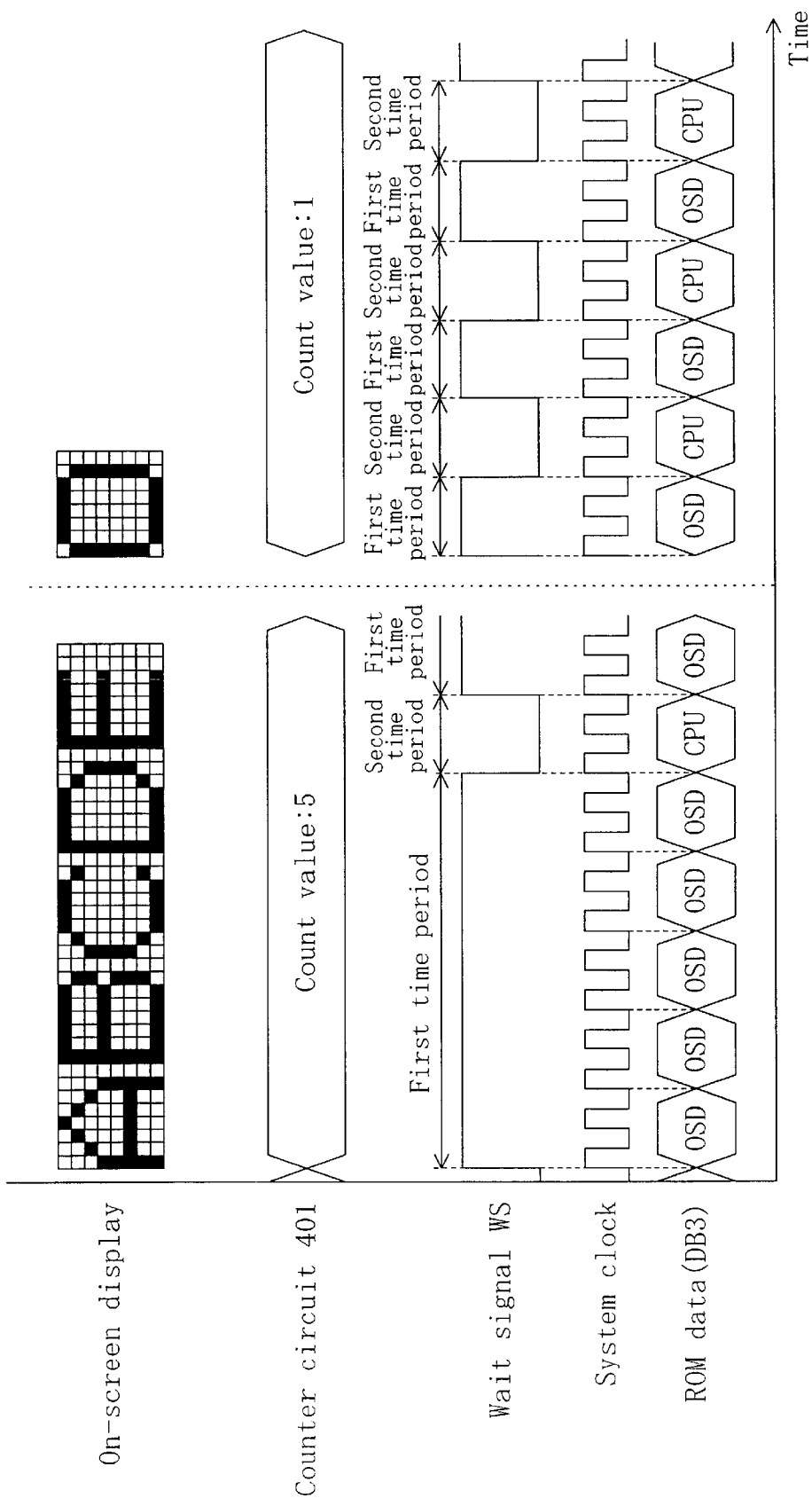
FIG. 5 is a view illustrating an example of timing of generation of a wait signal.

FIG. 5 shows an example of timing of generation of the wait signal WS. In FIG. 5, assume that five characters "ABCDE" are first on-screen displayed. Since the RAM 104 stores one unit of display control data DCS for each character as described above, display of "ABCDE" involves a total of five times of output of the display control data DCS from the RAM 104, and thus the count value CNT of the count circuit 401 retrieving the display control data DCS is 5. Therefore, the output circuit 402 sets the length of the first time period at ten (=5×2) cycles of the system clock and the length of the second time period at two cycles of the system clock.

Assume also that one character "O" is then on-screen displayed. Display of "O" involves one time of output of the display control data DCS, and thus the count value CNT of the count circuit 401 retrieving the display control data DCS is 1. Therefore, the output circuit 402 sets the length of the first time period at two (=1×2) cycles of the system clock and the length of the second time period at two cycles of the system clock.

A larger display data amount is required for the display of five characters "ABCDE" than for the display of one character "O". However, since the first time period of the wait signal WS is set longer for the display of five characters "ABCDE" than for the display of one character "O", the OSD circuit 102 can read the display data for the five characters for the longer time period.

<Effect>

As described above, in Embodiment 1, by changing the length of the first time period during which the wait signal WS is in the H level, the proportion of the ROM access time between the CPU 101 and the OSD circuit 102 can be changed. Therefore, it is possible to solve the problem that the OSD circuit 102 may fail in sufficient ROM access when the number of characters to be on-screen displayed is large and thus the display data amount to be read to the OSD circuit 102 is large. That is, the first time period is made longer as the number of display characters counted is larger, so that the access of the CPU 101 to the ROM 105 is halted for the extended time period. In this way, the access of the OSD circuit 102 to the ROM 105 can be increased in proportion. As a result, the OSD circuit 102 can execute the ROM access efficiently for the display data amount.

Although two cycles of the system clock was defined as the reference unit T in the above description, the reference unit T is not limited to this length. For example, one cycle of the system clock may be defined as the reference unit T. Also, although the length of the second time period was set at two cycles of the system clock, it is not limited to this length. For example, one cycle of the system clock may be used as the length of the second period.

Embodiment 2

Figure 6:
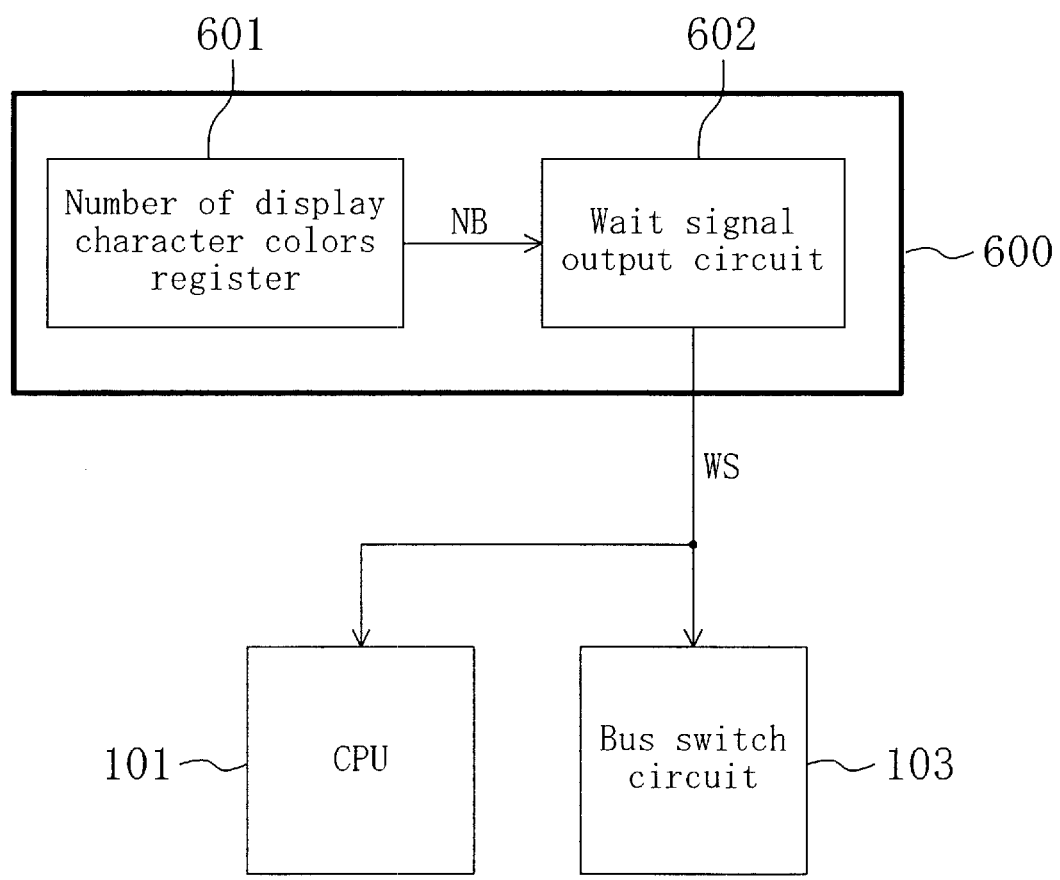
FIG. 6 is a block diagram of a wait signal generation circuit in Embodiment 2 of the present invention.

The microcomputer of Embodiment 2 of the present invention includes a wait signal generation circuit 600 shown in FIG. 6 in place of the wait signal generation circuit 400 shown in FIG. 4. The other components of the microcomputer of this embodiment are the same as those in Embodiment 1.

<Configuration of Wait Signal Generation Circuit 600>

As shown in FIG. 6, the wait signal generation circuit 600 includes a register 601 and an output circuit 602. The number of colors of a character to be on-screen displayed (number of display character colors) is set in the register

601. Herein, the number of display character colors refers to the number of colors selectable for a character. The output circuit 602 generates the wait signal WS based on the value NB set as the number of display character colors in the register 601.

<Operation of Wait Signal Generation Circuit 600>

The operation of the wait signal generation circuit 600 having the configuration described above will be described.

First, the number of display character colors is set in the register 601.

The output circuit 602 then determines the length of the first time period, during which the wait signal WS is in the H level, based on the value NB of the number of display character colors set in the register 601. As the value NB is larger, a longer first time period is determined. Assume herein that the length of the first time period is set at (NB×T) where T is the reference unit and herein defined as the time period corresponding to two cycles of a system clock. The length of the second time period is set at two cycles of the system clock, which is therefore constant irrelevant of the value NB. The output circuit 602 then outputs the wait signal WS, in which the H level of the first time period and the L level of the second time period are repeated alternately, to the CPU 101 and the bus switch circuit 103.

Figure 7:
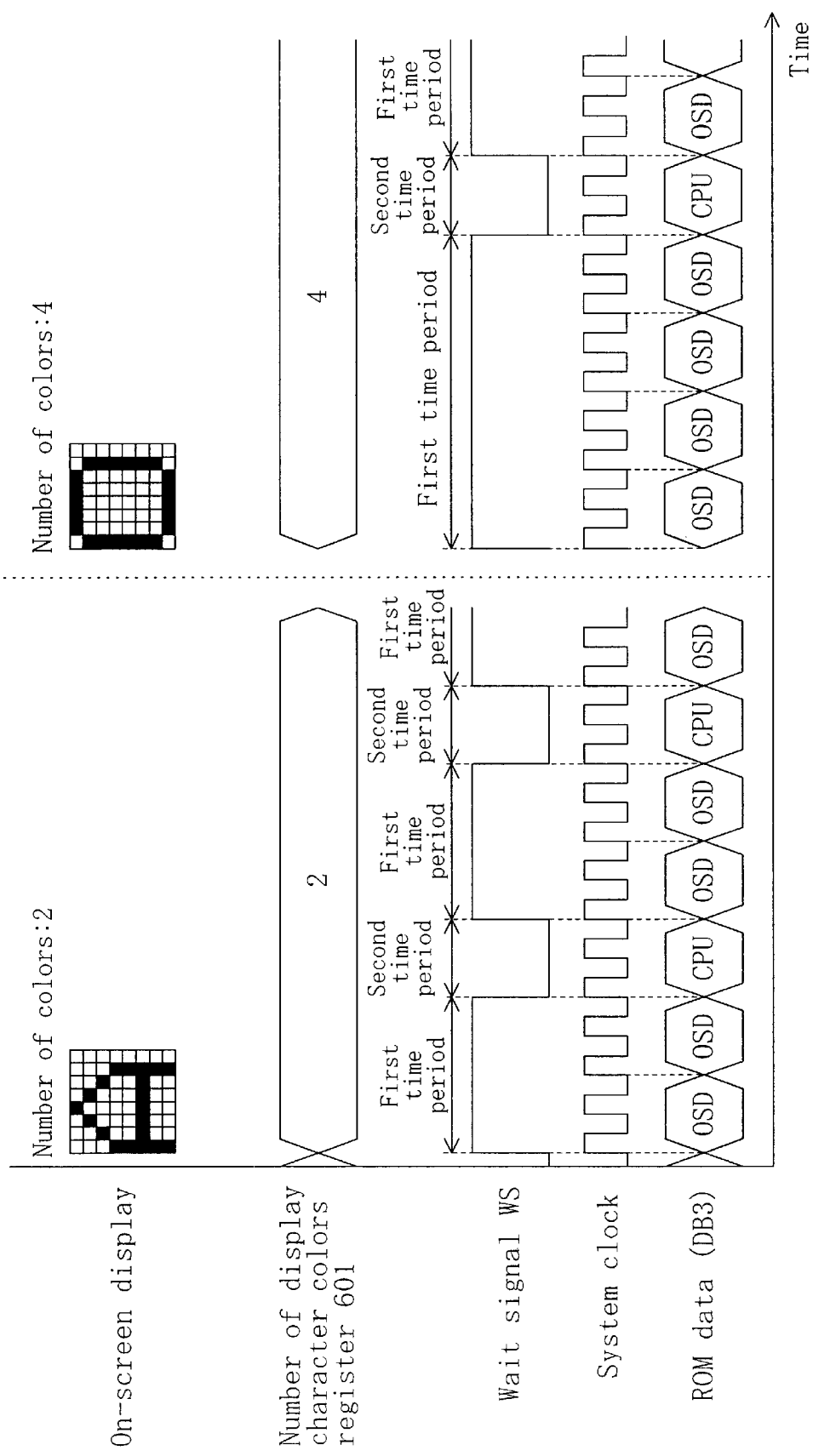
FIG. 7 is a view illustrating an example of timing of generation of a wait signal.

FIG. 7 shows an example of timing of generation of the wait signal SW. Referring to FIG. 7, assume that character "A" having the number of selectable colors of 2 is first displayed. For this display, therefore, the display data amount is twice as large as that of a character having the number of selectable colors of 1. Since the value NB of the number of display character colors is set at 2, the output circuit 602 sets the length of the first time period at four (=2×2) cycles of the system clock and the length of the second time period at two cycles of the system clock.

Assume also that character "O" having the number of selectable colors of 4 is then displayed. For this display, therefore, the display data amount is four times as large as that of a character having the number of selectable colors of 1. Thus, the output circuit 602 sets the length of the first time period at eight (=4×2) cycles of the system clock and the length of the second time period at two cycles of the system clock.

A larger display data amount is required for the display of character "O" having the number of display character colors of 4 than for the display of character "A" having the number of display character colors of 2. However, since the first period of the wait signal WS is longer for the display of character "O" having the number of display character colors of 4 than for the display of character "A" having the number of display character colors of 2, the OSD circuit 102 can read the display data for character "O" for the longer time period.

<Effect>

As described above, in Embodiment 2, it is possible to solve the problem that the OSD circuit 102 may fail in sufficient ROM access when the number of display character colors is large and thus the display data amount to be read to the OSD circuit 102 is large. That is, the first time period is made longer as the number of display character colors is larger, so that the access of the CPU 101 to the ROM 105 is halted for the extended time period. In this way, the access of the OSD circuit 102 to the ROM 105 can be increased in proportion. As a result, the OSD circuit 102 can perform the ROM access efficiently for the display data amount.

Although two cycles of the system clock was defined as the reference unit T in the above description, the reference unit T is not limited to this length. For example, one cycle of the system clock may be defined as the reference unit T.

Also, although the length of the second time period was set at two cycles of the system clock, it is not limited to this length. For example, one cycle of the system clock may be used as the length of the second period.

The wait signal generation circuit 600 in Embodiment 2 may be combined with the wait signal generation circuit 400 in Embodiment 1, to enable generation of a wait signal WS considering both the number of display characters and the number of display character colors.

While the present invention has been described in preferred embodiments, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A microcomputer comprising:
   a CPU
   a ROM for storing a program to be executed by the CPU and display data to be on-screen displayed on a display;
   an on-screen display (OSD) circuit for reading the display data stored in the ROM and outputting the read data to the display;
   a wait signal generation circuit for generating a wait signal having a first level of a first time period and a second level of a second time period repeated alternately; and
   a bus switch circuit for establishing a bus between the OSD circuit and the ROM when the wait signal is in the first level and establishing a bus between the CPU and the ROM when the wait signal is in the second level,
   wherein the wait signal generation circuit determines the length of the first time period according to the amount of the display data to be read from the ROM to the OSD circuit.

2. The microcomputer of claim 1, further comprising:
   a first bus placed between the ROM and the bus switch circuit;
   a second bus placed between the CPU and the bus switch circuit; and
   a third bus placed between the OSD circuit and the bus switch circuit,
   wherein the bus switch circuit connects the first bus with the third bus when the wait signal is in the first level and connects the first bus with the second bus when the wait signal is in the second level.

3. The microcomputer of claim 1, wherein the wait signal generation circuit determines the length of the first time period according to the number of characters to be on-screen displayed on the display.

4. The microcomputer of claim 1, wherein the wait signal generation circuit determines the length of the first time period according to the number of colors of a character to be on-screen displayed on the display.

5. A bus control device used when a CPU and an on-screen display (OSD) circuit share a same ROM, the ROM storing a program to be executed by the CPU and display data to be on-screen displayed on a display, the OSD circuit reading the display data stored in the ROM and outputting the read data to the display, the bus control device comprising:
   a wait signal generation circuit for generating a wait signal having a first level of a first time period and a second level of a second time period repeated alternately; and a bus switch circuit for establishing a bus between the OSD circuit and the ROM when the wait signal is in the first level and establishing a bus between the CPU and the ROM when the wait signal is in the second level, wherein the wait signal generation circuit determines the length of the first time period according to the amount of the display data to be read from the ROM to the OSD circuit.

6. The bus control device of claim 5, wherein the wait signal generation circuit determines the length of the first time period according to the number of characters to be on-screen displayed on the display.

7. The bus control device of claim 5, wherein the wait signal generation circuit determines the length of the first time period according to the number of colors of a character to be on-screen displayed on the display.

8. A bus control method used when a CPU and an on-screen display (OSD) circuit share a same ROM, the ROM storing a program to be executed by the CPU and display data to be on-screen displayed on a display, the OSD circuit reading the display data stored in the ROM and outputting the read data to the display, the bus control method comprising the step of:

performing first processing and second processing alternately, where the first processing comprises establishing a bus between the OSD circuit and the ROM for a first time period, and the second processing comprises establishing a bus between the CPU and the ROM for a second time period, wherein the length of the first time period is determined according to the amount of the display data to be read from the ROM to the OSD circuit.

9. The bus control method of claim 8, wherein the length of the first time period is determined according to the number of characters to be on-screen displayed on the display.

10. The bus control method of claim 8, wherein the length of the first time period is determined according to the number of colors of a character to be on-screen displayed on the display.

* * * * *